United States Patent
Endo (10) Patent No.: US 8,509,529 B2
(45) Date of Patent: Aug. 13, 2013

(54) COLOR-IMAGE REPRESENTATIVE COLOR DECISION APPARATUS AND METHOD OF CONTROLLING OPERATION THEREOF

(75) Inventor: Hisashi Endo, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 574 days.

(21) Appl. No.: 12/762,056

(22) Filed: Apr. 16, 2010

(65) Prior Publication Data

US 2010/0266199 A1  Oct. 21, 2010

(30) Foreign Application Priority Data

Apr. 20, 2009  (JP) ................................ 2009-101723

(51) Int. Cl.
*G06K 9/34*  (2006.01)

(52) U.S. Cl.
USPC ........... 382/164; 382/103; 382/165; 382/239; 348/222.1

(58) Field of Classification Search
USPC ............... 382/103, 164, 165, 239; 348/222.1
See application file for complete search history.

(56) References Cited

U.S. PATENT DOCUMENTS

| 6,128,407 A * | 10/2000 | Inoue et al. ................... 382/167 |
| 6,529,202 B2 * | 3/2003 | Wu ............................... 345/593 |
| 2003/0026479 A1 * | 2/2003 | Thomas et al. ............... 382/173 |

FOREIGN PATENT DOCUMENTS

| JP | 06-259539 A | 9/1994 |
| JP | 10-289242 A | 10/1998 |
| JP | 2008-234124 A | 10/2008 |

* cited by examiner

Primary Examiner — David Zarka
Assistant Examiner — Eueng-Nan Yeh
(74) Attorney, Agent, or Firm — Sughrue Mion, PLLC (57) ABSTRACT

A color that readily leaves an impression is adopted as the representative color of a color image. Pixels that form a color image are distributed in L*a*b* color space and are projected onto the a*b* plane. The pixels are grouped and the color at the centroid position of each group is adopted as a representative candidate color. A first score is calculated based upon the distance from the origin, which is indicative of gray, to the representative candidate color, and a second score is calculated from the number of pixels contained in the group. A final score is calculated from the first and second scores and representative candidate colors that provide the three highest final scores are decided upon as representative colors.

6 Claims, 7 Drawing Sheets

COLOR-IMAGE REPRESENTATIVE COLOR DECISION APPARATUS AND METHOD OF CONTROLLING OPERATION THEREOF

BACKGROUND OF THE INVENTION

1. Field of the Invention

This invention relates to an apparatus for deciding a representative color of a color image, and to a method of controlling the operation of this apparatus.

2. Description of the Related Art

In cases where a desired image is to be found among a number of images, color can be utilized as a search key. An image having the color designated as the search key is found from among the number of images. For example, the specification of Japanese Patent Application Laid-Open No. 2008-234124 discloses generating a color histogram with regard to a color image, assigning scores to maximal intervals of the color histogram based upon frequency of occurrence, hue, saturation, lightness and position on the image, and outputting one representative color at a time from intervals having high scores. The specification of Japanese Patent Application Laid-Open No. 10-289242 discloses extracting from an image a representative color that contributes to an impression received by a person, based upon frequency of occurrence of a hue. Accordingly to the specification of Japanese Patent Application Laid-Open No. 6-259539, when image data is reduced in terms of number of colors and displayed as a small number of representative colors, the color reduction is applied to the original image so as not to produce an unnatural appearance.

However, none of these examples of the prior art gives any thought to the adoption of a color that readily leaves an impression on a human being as a representative color.

SUMMARY OF THE INVENTION

Accordingly, an object of the present invention is to adopt a color that readily leaves an impression on a human being as a representative color.

According to the present invention, the foregoing object is attained by providing an apparatus for deciding a representative color of a color image, comprising: a grouping device for dividing pixels, which construct a color image represented by applied color image data, into a plurality of groups in color space in such a manner that pixels at positions close to one another in color space will belong to the same group; a representative candidate color deciding device for deciding as a representative candidate color, group by group, any one color (pixel color) among the colors (pixels) belonging to each group of the plurality of groups divided by the grouping device; and a candidate color deciding device for deciding that, from among a plurality of representative candidate colors decided group by group by the representative candidate color deciding device, the color of one or a plurality of pixels present at a position remote from the position of gray in this color space is the representative color of the color image. The representative candidate color deciding device may decide that the representative candidate color is the color of a pixel belonging to a group. If the representative candidate color is a color in the color space within a group, as at the centroid position in the color space within the group, then the color may be a color not possessed by the pixels that construct the color image. It will suffice if the representative candidate color of a group is decided group by group.

The present invention also provides an operation control method suited to the above-describe apparatus for deciding a representative color of a color image. The method comprises the steps of: dividing pixels, which construct a color image represented by applied color image data, into a plurality of groups in color space in such a manner that pixels at positions close to one another in color space will belong to the same group; deciding as a representative candidate color, group by group, any one color among the colors belonging to each group of the plurality of groups divided; and deciding that, from among a plurality of representative candidate colors decided group by group, the color of one or a plurality of pixels present at a position remote from the position of gray in this color space is the representative color of the color image.

The present invention also provides a recording medium storing a program for implementing the method of controlling the operation of the apparatus for deciding a representative color of a color image. It may be so arranged that such a program is provided.

In accordance with the present invention, the pixels that construct a color image are divided into a plurality of groups for every pixel at positions close to one another in color space (i.e., a plurality of color-space groups are generated). In each group of the plurality of groups, any one color among the colors belonging to the group is decided upon as a representative candidate color. A representative candidate color is decided for every group. From among the plurality of representative candidate colors corresponding to the plurality of groups, the color of one or a plurality of pixels present at a position remote from the position of gray in color space is decided upon as the representative color of the color image. In accordance with the present invention, the color of a pixel present at a position remote from the position of gray is decided upon as the representative color. Gray does not readily leave an impression on a human being. However, since a color remote from such a color becomes the representative color, a color that readily leaves an impression on a human being becomes the representative color. Further, the plurality of representative candidate colors are separated from one another in color space. Therefore, in a case where a plurality of colors are decided upon as representative colors from among the plurality of representative candidate colors, a situation in which the plurality of representative colors that have been decided are similar colors can be prevented.

By way of example, the representative color deciding device decides that, from among a plurality of representative candidate colors decided group by group, the color of one or a plurality of pixels present at a position where saturation or lightness is remote from the position of gray in this color space is the representative color of the color image.

By way of example, the grouping device divides pixels, which construct a color image represented by applied color image data, into a plurality of groups in color space in a chromaticity plane in such a manner that pixels at positions close to one another in this color space in this chromaticity plane, onto which the pixels have been projected, will belong to the same group.

By way of example, the grouping device divides the pixels into a plurality of group spaces of equal size to which pixels for which the positions of the color thereof in color space are close together belong. In this case, the representative color deciding device would include a first score calculating device for scoring distance, in the above-mentioned color space, between a representative candidate color that has been decided for every group by the representative candidate color deciding device and a color that has been decided in advance, and a second score calculating device for scoring the number of pixels in each group space. The representative color deciding device would decide the representative color of the color image based upon the scores obtained by the first score calculating device and the scores obtained by the second score calculating device.

By way of example, the representative color deciding device outputs data representing a hue value of the representative color that has been decided.

Other features and advantages of the invention will be apparent from the following description taken in conjunction with the accompanying drawings, in which like reference characters designate the same or similar parts throughout the figures thereof.

DESCRIPTION OF THE PREFERRED EMBODIMENTS

A preferred embodiment of the present invention will now be described in detail with reference to the drawings.

Figure 1:
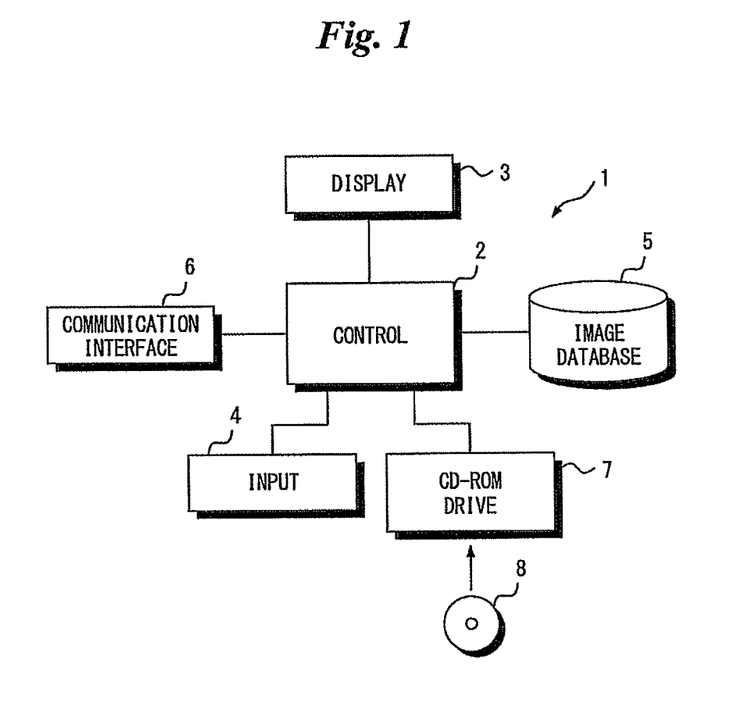
FIG. 1 is a block diagram illustrating the electrical configuration of an apparatus for deciding a representative color of a color image.

FIG. 1 is a block diagram illustrating the electrical configuration of an apparatus 1 for deciding a representative color of a color image according to a preferred embodiment of the present invention.

The overall operation of the representative color deciding apparatus 1 is controlled by a control unit 2.

The representative color deciding apparatus 1 includes an image database 5 in which image data representing a number of images has been stored, and a communication interface 6 for being connected to a network. Image data that has been input from the communication interface 6 is stored in the image database 5. Naturally, it may be so arranged that the representative color deciding apparatus 1 is provided with an image data input unit and image data that has been input from this image data input unit is stored in the image database 5.

The representative color deciding apparatus 1 is further provided with a display unit 3 and an input unit 4. A color image for deciding a representative color is designated by the input unit 4. Image data representing the designated color image is read from the image database 5 and the representative color of the color image is decided in a manner described later.

The representative color deciding apparatus 1 is further provided with a CD-ROM (compact disk-read-only memory) 7. A CD-ROM 8 storing a program for performing an operation described later is loaded into a CD-ROM drive 7 and the program is installed in the representative color deciding apparatus 1 by reading it from the disk. Naturally, the program, instead of being read from the CD-ROM 8, may be downloaded via the network or pre-installed in the representative color deciding apparatus 1.

Figure 2:
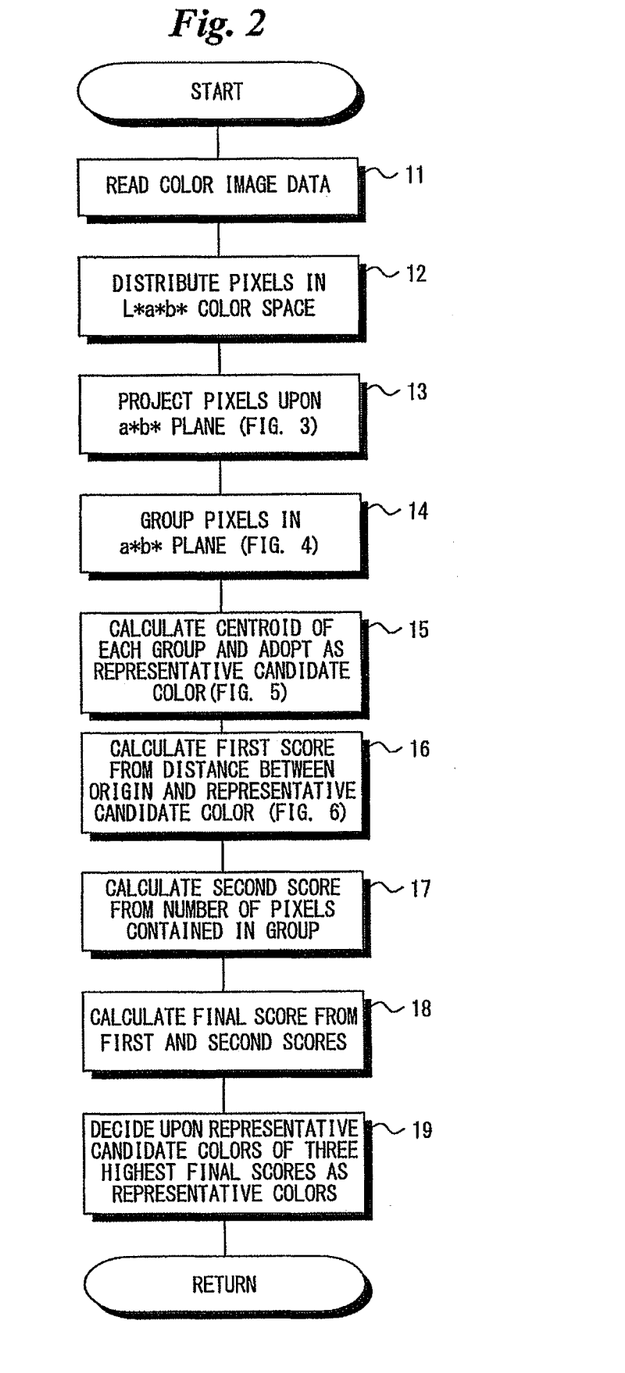
FIG. 2 is a flowchart illustrating processing executed by the apparatus for deciding a representative color of a color image.

FIG. 2 is a flowchart of processing executed by the representative color deciding apparatus 1.

A color image for deciding a representative color is designated by the input unit 4 and color image data representing the color image designated is read from the image database 5 (step 11). The pixels that construct the color image represented by the read color image data are caused to be distributed in the color space of a L*a*b* colorimetric system (i.e., in L*a*b* color space) (step 12). The pixels that have been distributed in L*a*b* color space are projected onto the a*b* plane in the L*a*b* color space (step 13).

Figure 3:
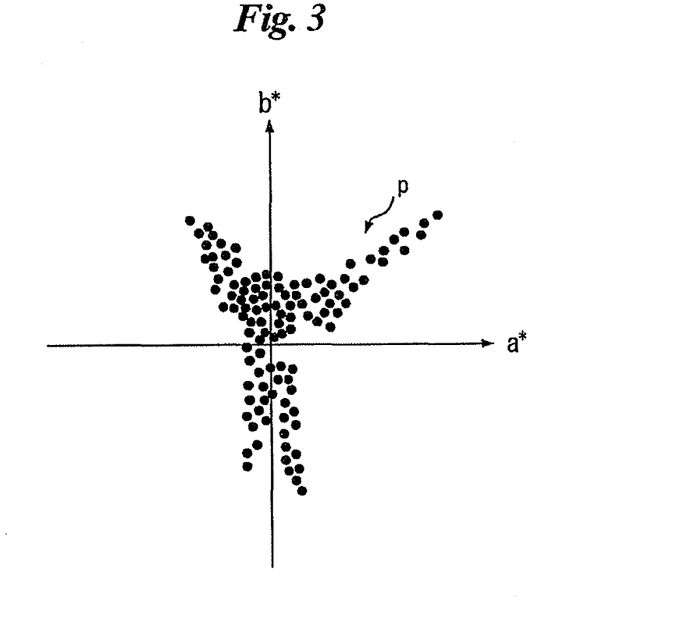
FIG. 3 illustrates a distribution of pixels.

FIG. 3 illustrates a pixel distribution that has been projected onto the a*b* plane in L*a*b* color space.

By projecting the pixels that construct the color image onto the a*b* plane, a distribution diagram of pixels p that have been projected on the a*b* plane is obtained. The pixels have been distributed to positions in the a*b* plane corresponding to values of hue and saturation (chromaticity) of the pixels p.

With reference again to FIG. 2, the pixels p that have been distributed in the a*b* plane are grouped into a plurality of groups (step 14).

Figure 4:
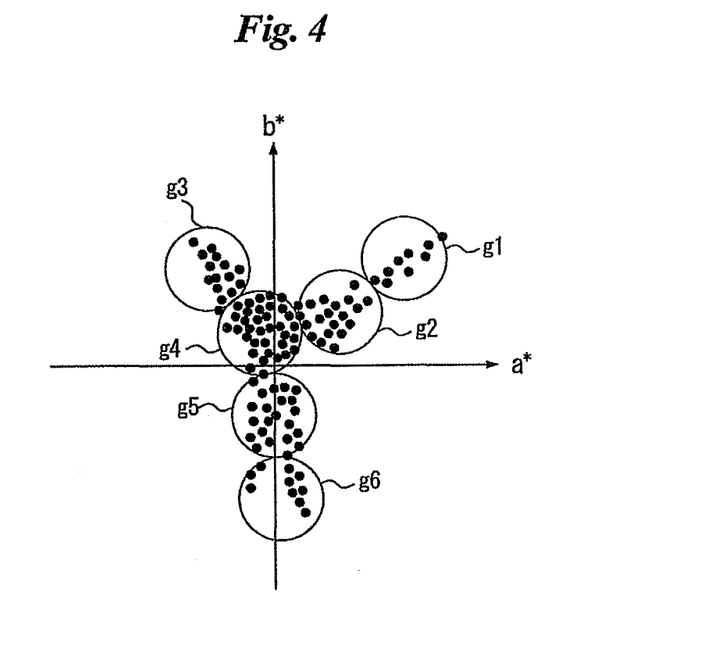
FIG. 4 illustrates how pixels have been grouped.

FIG. 4 illustrates the manner in which the pixels p distributed in the a*b* plane have been grouped. In this embodiment, the multiplicity of pixels p have been divided into six groups g1 to g6 by the k-means method.

The six groups g1 to g6, which are indicated by circles, are formed into group spaces in such a manner that the sizes of the respective circles are the same. The numbers of pixels belonging to the groups g1 to g6 differ for every group.

With reference again to FIG. 2, the centroid of each group is calculated and a color indicated by the position of the calculated centroid is decided upon as the representative candidate color of the group (step 15).

Figure 5:
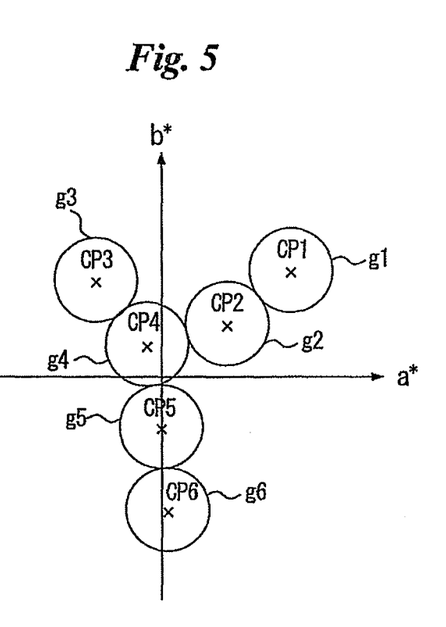
FIG. 5 illustrates group centroid positions.

FIG. 5 illustrates the positions of the centroids of the groups g1 to g6.

The centroids of the groups g1, g2, g3, g4, g5 and g6 are CP1, CP2, CP3, CP4, CP5 and CP6, respectively. The centroids CP1 to CP6 are adopted as representative candidate colors.

With reference again to FIG. 2, the distance from the origin of the a*b* plane to each of the representative candidate colors CP1 to CP6 is calculated and a first score S1 is calculated based upon these distances calculated (step 16).

Figure 6:
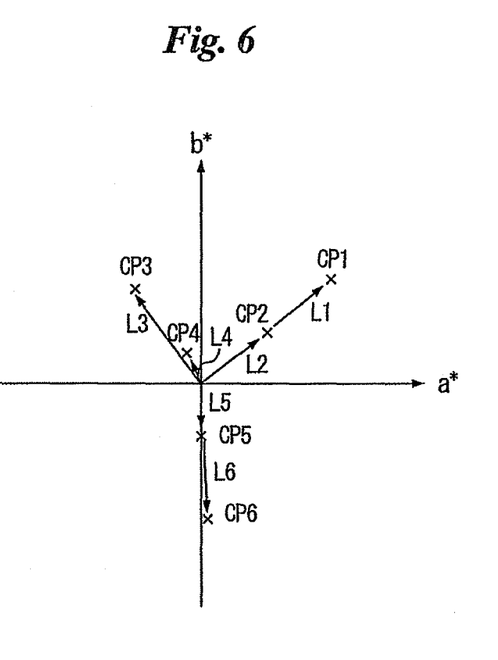
FIG. 6 illustrates representative candidate colors.

FIG. 6 illustrates the representative candidate colors CP1 to CP6 in the a*b* plane.

The distances from the origin to the representative candidate colors CP1 to CP6 in the a*b* plane are represented by L1 to L6, respectively. A first score is calculated for every representative candidate color by normalizing each of the distances L1 to L6 as necessary. For example, the first scores of the first representative candidate color CP1, second representative candidate color CP2, third representative candidate color CP3, fourth representative candidate color CP4, fifth representative candidate color CP5 and sixth representative candidate color CP6 are S11, S12, S13, S14, S15 and S16, respectively. The distances per se from the origin to the representative candidate colors CP1 to CP6 may be adopted as the first scores if desired.

The origin in the a*b* plane indicates gray. A color that is remote from the origin means a color that does not resemble gray. Gray is a color that does not readily leave an impression on a human being. By adopting a color that does not resemble gray as the representative color, therefore, a color that readily leaves an impression on a human being can be decided upon as the representative color. In particular, in this embodiment, a color remote from the position of gray is adopted as a candidate for the representative color upon distributing the pixels in the a*b* plane, and therefore a color whose saturation is remote from gray becomes a candidate for the representative color.

With reference again to FIG. 2, the number of pixels contained in each group is calculated for every group and a second score is calculated from the number of pixels (step 17). The number of pixels calculated for every group is normalized if necessary and the normalized number of pixels is calculated as the second score. For example, second scores of the first representative candidate color CP1, second representative candidate color CP2, third representative candidate color CP3, fourth representative candidate color CP4, fifth representative candidate color CP5 and sixth representative candidate color CP6 are S21, S22, S23, S24, S25 and S26, respectively. The numbers of pixels per se may be adopted as the second scores if desired.

Next, a final score is calculated group by group from the first and second scores that have been calculated (step 18). For example, the final scores of the first representative candidate color CP1, second representative candidate color CP2, third representative candidate color CP3, fourth representative candidate color CP4, fifth representative candidate color CP5 and sixth representative candidate color CP6 are (S11+S21), (S12+S22), (S13+S23), (S14+S24), (S15+S25) and (S16+S26) respectively. The final score may be the sum or the product of the first and second scores. Further, a value obtained by weighting the first and second scores appropriately and then adding the weighted scores may be adopted as the final score.

If the final scores are calculated with regard to all representative candidate colors, the representative candidate colors that provide the three highest final scores among the final scores are decided upon as the representative colors for the color image (step 19).

Figure 7:
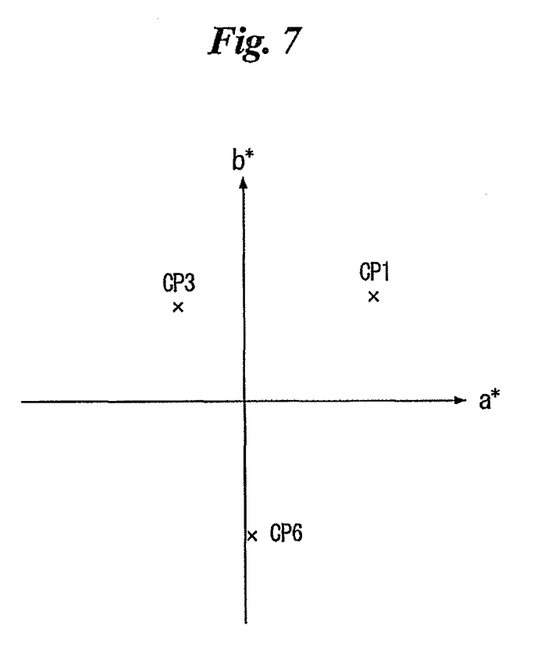
FIG. 7 illustrates representative colors.

FIG. 7 illustrates the positions of the decided representative colors in the a*b* plane. In this embodiment, the three representative candidate colors CP1, CP3 and CP6 that are far from the origin of the a*b* plane have been decided upon as the representative colors.

Data representing the representative colors thus decided is recorded in a header recording area of the image file containing the color image data. In a case where color is utilized as the search key, the color image that possesses the designated color as the representative color will be found by the search.

Although L*a*b* color space is utilized in this embodiment, color spaces other than L*a*b* color space, such as YCrCb color space, RGB color space, L*u*v* color space and HSV color space can be utilized as well. Further, although the pixels are projected onto the a*b* plane, it may be arranged so that the above-described processing is executed in L*a*b* color space without projecting the pixels upon the a*b* plane. In a case where the above-described processing is executed in L*a*b* color space, a color remote from gray along the lightness direction (L direction) can be adopted as a candidate for representative color. A color close to white or black can be decided upon as the representative color.

Furthermore, although grouping divides the pixels utilizing the k-means method such that the group spaces take on the same size, the sizes of the group spaces (groups) need not necessarily be the same. Further, it may be so arranged that a representative color can be decided from among representative candidate colors by using only the first scores or the second scores. Further, rather than adopting the color at the position of the centroid of a group as the representative candidate color, the color at a position such as the center of a group may be adopted as the representative candidate color.

Furthermore, it may be so arranged that a representative color decided as described above is obtained (output) by adopting only the hue value as the representative color. This makes it possible to reduce the amount of data.

Figure 8:
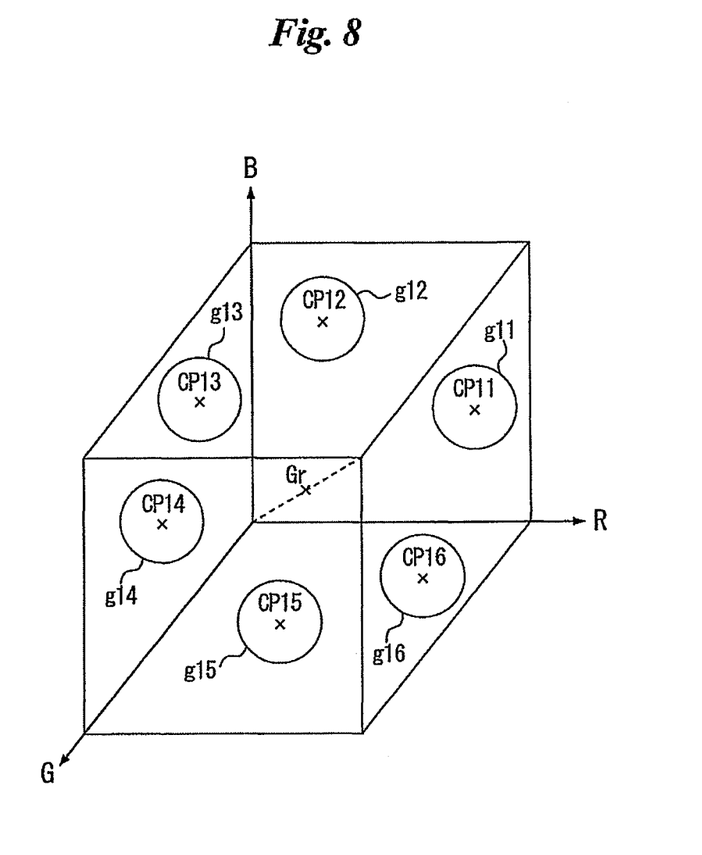
FIG. 8 illustrates RGB color space.

FIG. 8 shows another embodiment. This illustrates the manner in which a number of pixels (not shown) distributed in RGB color space have been grouped.

A multiplicity of pixels that construct a color image are distributed in RGB color space and these pixels are grouped to form groups g11 to g16 in the manner described above. In each of the groups g11 to g16, the colors at the centroids of the groups are decided upon as representative candidate colors CP11 to CP16, respectively.

Final scores are calculated from first scores obtained based upon the distances from a gray position Gr to the representative candidate colors and second scores obtained based upon the numbers of pixels belonging to the groups. The representative candidate colors that provide the three highest final scores calculated are decided upon as the representative colors.

Although three representative colors are decided in the foregoing embodiments, the number of representative colors may be one or three or more. The representative candidate colors are separated from one another in color space. In a case where there are a plurality of representative colors, therefore, it is possible to prevent similar colors from being adopted as representative colors.

It may be so arranged that a digital still camera (digital camera) or a digital movie video camera having a still function is equipped with the apparatus for deciding a representative color of a color image according to the foregoing embodiments. This will make it possible to decide a representative color of a color image that has been captured using the camera.

Figure 9:
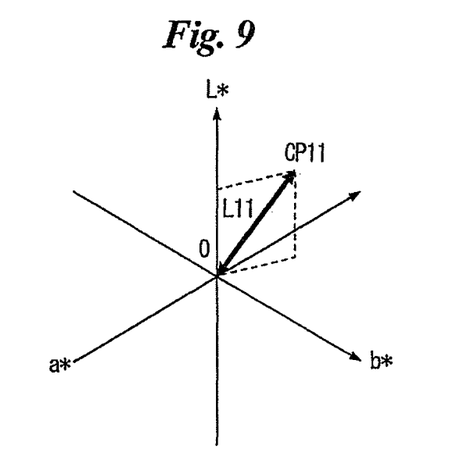
FIGS. 9 to 11 illustrate L*a*b* color space.
Figure 10:
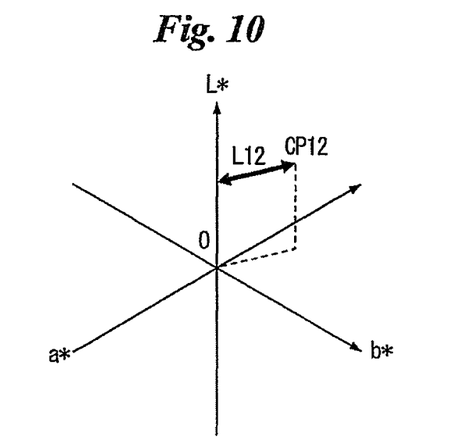
Figure 11:
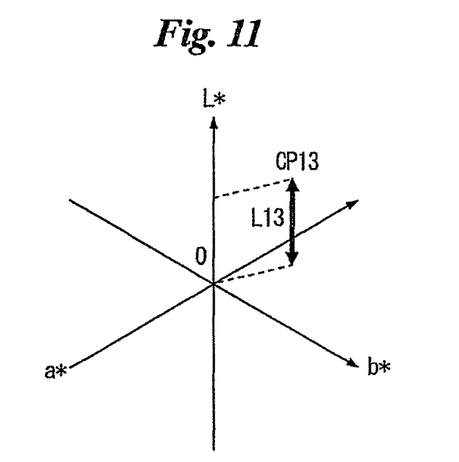

FIGS. 9 to 11 illustrate representative candidate colors in L*a*b* color space.

A representative candidate color is decided in three-dimensional color space, as in L*a*b* color space, and with regard to the distance between the position of the representative candidate color and the position of gray, a distance L11 from the origin of the color space to the representative candidate color CP11 may be considered, as shown in FIG. 9, or a distance L12 extended from the representative candidate color CP12 toward the lightness axis L* so as to lie perpendicular to the lightness axis L* may be considered, as shown in FIG. 10, or a distance L13 extended from the representative candidate color CP13 toward the a*b* plane so as to lie perpendicular to the a*b* plane may be considered, as shown in FIG. 11. That is, the position of gray in a case where the distance to the position of a representative candidate color is considered may be the origin of the color space, as shown in FIG. 9, or may be any position along the lightness axis where the saturation is zero, as shown in FIG. 10. Furthermore, a position in the a*b* plane passing through the lightness midpoint (the origin O is the midpoint along the lightness axis) may be adopted as the position of gray, as shown in FIG. 11.

It goes without saying that the foregoing is applicable not only to L*a*b* color space but also to color space in which a certain direction represents lightness.

It goes without saying that the position of gray need not be a point where saturation is perfectly zero and lightness is at its midpoint but may be a point somewhat offset from this position. For example, in the case of a color image with a greenish tint under fluorescent light, gray is shifted along the green direction and therefore a position offset along the green direction is conceivable as the position of gray. When a night-scene mode has been set, an impression will be left even if the scene is somewhat bright. Accordingly, a position shifted from the lightness midpoint toward the dark side is conceivable as the position of gray.

Data representing the representative color of a color image, in which the representative color has been decided as described above, can be recorded in the header of the image file containing the data representing the color image. (For example, the data can be recorded in an Exif tag.) By storing the data representing the representative color in the header of an image file, the color image having the desired representative color can be found by conducting a search utilizing the representative color, which has been appended to the color image, when the image is reproduced on an image search apparatus, image display apparatus, image server or digital camera (digital still camera), etc.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for deciding a representative color of a color image, comprising:
    a grouping device configured to divide pixels, which construct a color image represented by applied color image data, into a plurality of groups in color space in such a manner that pixels at positions close to one another in color space will belong to the same group;
    a representative candidate color deciding device configured to decide as a representative candidate color, group by group, any one color among the colors belonging to each group of the plurality of groups divided by said grouping device; and
    a candidate color deciding device configured to decide that, from among a plurality of representative candidate colors decided group by group by said representative candidate color deciding device, the color of one or a plurality of pixels present at a position remote from the position of gray in this color space is the representative color of the color image,
    wherein said grouping device divides the pixels into a plurality of group spaces of equal size to which pixels for which the positions of the color thereof in color space are close together belong;
    wherein said representative color deciding device includes:
    a first score calculating device configured to score distance, in said color space, between a representative candidate color that has been decided for every group by said representative candidate color deciding device and a color that has been decided in advance; and
    a second score calculating device configured to score the number of pixels in each group space;
    said representative color deciding device deciding the representative color of the color image based upon the scores obtained by said first score calculating device and the scores obtained by said second score calculating device.

2. The apparatus according to claim 1, wherein said representative color deciding device decides that, from among a plurality of representative candidate colors decided group by group, the color of one or a plurality of pixels present at a position where saturation or lightness is remote from the position of gray in this color space is the representative color of the color image.

3. The apparatus according to claim 1, wherein said grouping device divides pixels, which construct a color image represented by applied color image data, into a plurality of groups in color space in a chromaticity plane in such a manner that pixels at positions close to one another in this color space in this chromaticity plane, onto which the pixels have been projected, will belong to the same group.

4. The apparatus according to claim 1, wherein said representative color deciding device outputs data representing a hue value of the representative color that has been decided.

5. A method of controlling operation of an apparatus for deciding a representative color of a color image, comprising the steps of:
    dividing pixels, which construct a color image represented by applied color image data, into a plurality of groups in color space in such a manner that pixels at positions close to one another in color space will belong to the same group;
    deciding as a representative candidate color, group by group, any one color among the colors belonging to each group of the plurality of groups divided; and
    deciding that, from among a plurality of representative candidate colors decided group by group, the color of one or a plurality of pixels present at a position remote from the position of gray in this color space is the representative color of the color image,
    wherein said step of dividing pixels includes dividing the pixels into a plurality of group spaces of equal size to which pixels for which the positions of the color thereof in color space are close together belong;
    wherein said deciding representative candidate color includes:
    a first score calculating step to score distance, in said color space, between a representative candidate color that has been decided for every group by said representative candidate color deciding step and a color that has been decided in advance; and
    a second score calculating step configured to score the number of pixels in each group space;
    said representative color deciding step deciding the representative color of the color image based upon the scores obtained by said first score calculating step and the scores obtained by said second score calculating step.

6. A non-transitory recording medium storing a computer-readable program for controlling a computer of an apparatus for deciding a representative color of a color image, said program controlling the computer so as to:
    divide pixels, which construct a color image represented by applied color image data, into a plurality of groups in color space in such a manner that pixels at positions close to one another in color space will belong to the same group;
    decide as a representative candidate color, group by group, any one color among the colors belonging to each group of the plurality of groups divided; and
    decide that, from among a plurality of representative candidate colors decided group by group, the color of one or a plurality of pixels present at a position remote from the position of gray in this color space is the representative color of the color image,
    wherein said divide pixels step includes dividing pixels into a plurality of group spaces of equal size to which pixels for which the positions of the color thereof in color space are close together belong;
    wherein said representative color deciding step includes:
    a first score calculating step to score distance, in said color space, between a representative candidate color that has been decided for every group by said representative candidate color deciding step and a color that has been decided in advance; and a second score calculating step configured to score the number of pixels in each group space;

said representative color deciding step includes deciding the representative color of the color image based upon the scores obtained by said first score calculating step and the scores obtained by said second score calculating step.

* * * * *